United States Patent Office 3,574,755
Patented Apr. 13, 1971

3,574,755
HIGH PURITY OLEFIN OXIDE ADDUCTS OF ALKYL AND ALKENYL AMINES
Robert B. McConnell and Robert A. Swenson, Janesville, Wis., assignors to Northern Petrochemical Company, Omaha, Nebr.
No Drawing. Filed Oct. 14, 1968, Ser. No. 767,464
Int. Cl. C07c 91/12
U.S. Cl. 260—584                                       11 Claims

ABSTRACT OF THE DISCLOSURE

Disclosed are olefin oxide adducts of alkyl and alkenyl primary amines and olefin oxide adducts of alkyl and alkenyl trimethylene diamines. The amine is first reacted with about one to three moles of an olefin oxide containing at least three carbons to form an intermediate which is then reacted with ethylene oxide to form the desired products. The products are surface active agents characterized by light color and low amounts of nonamine impurities.

---

This invention relates to amine derivatives. More particularly, this invention is concerned with novel olefin oxide adducts of alkyl and alkenyl primary amines and olefin oxide adducts of alkyl and alkenyl trimethylene diamines.

Olefin oxide adducts of alkyl and alkenyl primary amines and alkyl and alkenyl trimethylene diamines are commercially available and widely used as surface active agents, emulsifiers, textile aids and for many other uses. Probably the most widely used of these products are those having the formulae

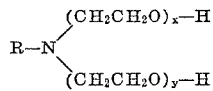

and

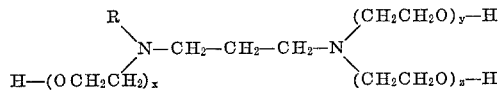

where R is an alkyl or alkenyl group having from about 6 to 30 carbons, but usually about 8 to 20 carbons, and $x$, $y$ and $z$ are numbers from about 1 to 50 and usually from about 5 to 30.

In the production of the olefin oxide adducts of alkyl or alkenyl primary amines a two step process is usually employed. In the first step, one mole of the alkyl or alkenyl primary amine is reacted with two moles of the olefin oxide, i.e., ethylene oxide. Usually used are fatty amines from natural oils such as coco, tallow, soya and tall oils. This reaction proceeds readily by bringing the reactants together and subjecting them to a temperature of about 50 to 200° C. In this way an intermediate N,N-bis(2-hydroxyethyl)-N-alkyl or alkenyl amine is produced having the formula

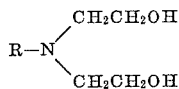

The N,N-bis(2-hydroxyethyl)-N-alkyl or alkenyl amine is then reacted, in the second step, with such additional amount of the same olefin oxide, i.e., ethylene oxide, as to form polyethoxyethanol chains of the desired length. This step can be represented as follows:

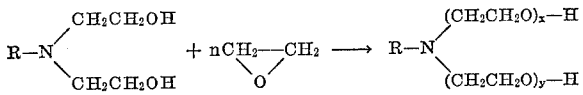

wherein $x$, $y$ and R have the significance previously assigned and $n$ equals $x+y$. A catalyst such as sodium metal, sodium hydroxide and potassium hydroxide is generally employed to promote the reaction.

A two step process, analogous to that described for the alkyl or alkenyl primary amines, is employed with alkyl or alkenyl trimethylene diamines to form olefin oxide adducts thereof.

Although olefin oxide adducts of alkyl or alkenyl amines and alkyl or alkenyl trimethylene diamines have been produced as described and used commercially for many years the products are usually dark colored and contain varying amounts of nonamine, or nitrogen-free, impurities at least some of which are deleterious to optimum performance of the products.

The nonamine materials present in ethoxylated alkyl or alkenyl primary amines are generally considered to be caused by reaction of ethylene oxide with water present in the system. The presence of water in the system while ethoxylating with a strong basic catalyst also leads to discoloration of the adduct. It is possible to control to some extent the formation of polyethylene glycols during ethoxylation by excluding water from the system. Exclusion of water from the system, however, does not always give a light colored product, or low nonamine content, when a basic catalyst is used.

We have discovered that strongly basic quaternary ammonium compounds form during the reaction of ethylene oxide with amines. The rate of formation of these strongly basic compounds generally reaches a maximum between the time two moles of ethylene oxide have reacted with one mole of alkyl or alkenyl primary amine, and about 4 moles of ethylene oxide have reacted per mole of alkyl or alkenyl primary amine. Thereafter, the rate of formation of strong base decreases, and ultimately, as ethoxylation proceeds, no more is formed.

Whe have proposed a structure for the strong base, and the following mechanism for its formation, in which R has the assigned meaning:

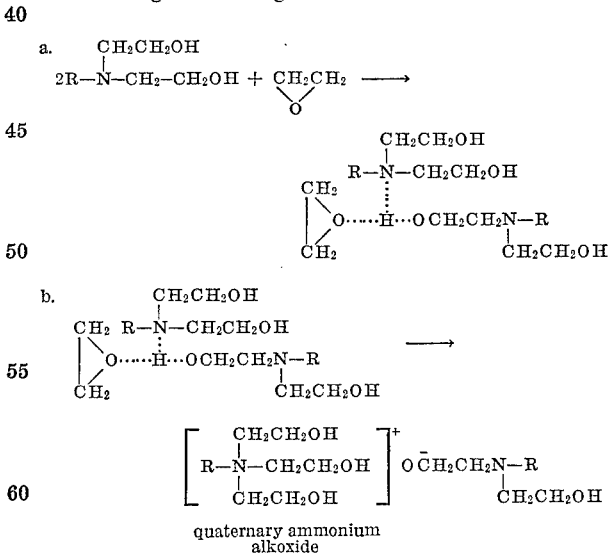

quaternary ammonium alkoxide

The quaternary ammonium alkoxide can then rearrange to give a quaternary ammonium hydroxide and an alkyl morpholine:

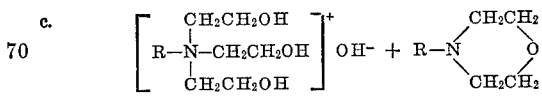

We have detected the presence of alkyl or alkenyl morpholine compounds in ethoxylated amines, which indicates that quaternary ammonium hydroxide formation does occur during ethoxylation. This is an unusual phenomenon. It is known that quaternary ammonium hydroxides can be produced by ethoxylation of amines in the presence of water; however, one would not expect this to occur in the absence of water. We have found that strong base formation does occur during ethoxylation in the absence of water, and we attribute the formation to the mechanism previously described. The presence of a strong quaternary base in ethoxylated amines is evidenced by the high pH of such compounds, and the quantity of such base may be estimated by titration of the ethoxylated amine with acid solution to the phenolphthalein end point.

Quaternary ammonium bases, and quaternary ammonium hydroxides in particular, are well known to be unstable compounds. Such compounds decompose quantitatively at elevated temperatures to yield a tertiary amine, an olefin, and water. Thus it appears that the formation and decomposition of quaternary bases occur simultaneously during ethoxylation of amines, and that the decomposition products from the quaternary base give rise to discoloration and nonamine impurities. This is illustrated below, in which $R_1$ is alkyl or alkenyl and $R_2$ and $R_3$ are 2-hydroxyethyl groups.

(1) Decomposition of the base can yield acetaldehyde, which causes discoloration.

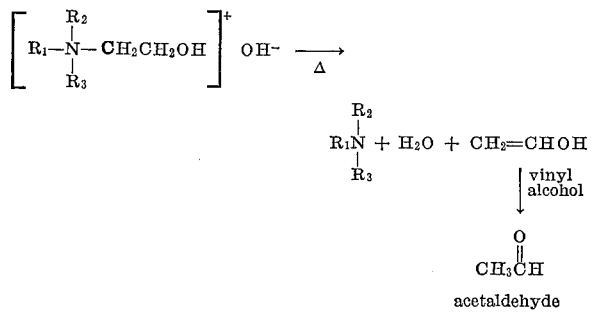

(2) Decomposition of the base can yield two types of unsaturated compounds which are present as nonamine impurities.

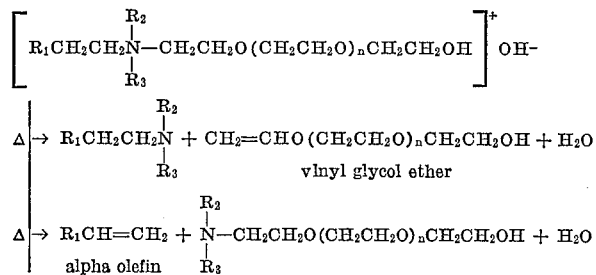

(3) Water liberated by the decomposition of the base can react with additional ethylene oxide to form polyethylene glycols.

Five types of impurities which arise from the formation and decomposition of quaternary ammonium bases have been detected and identified by distillation, gas chromatography, and infrared spectrophotometry in ethoxylated amines. The impurities are alkyl or alkenyl morpholines, alpha olefins, acetaldehyde, vinyl glycol ethers and polyethylene glycols.

If the formation, or decomposition, of quaternary ammonium bases could be prevented during ethoxylation, a much purer ethoxylate would result. One way of preventing the decomposition of the base would be to ethoxylate the amine at a temperature sufficiently low that the base is stable. However, when this is done the base is present in the product, and exposure of the product to heat will decompose the base and liberate nonamine impurities. Thus, it would be better to prevent the formation of a quaternary base if possible.

We have discovered that when an alkyl or alkenyl primary amine is reacted with one to two or more moles of an olefin oxide other than ethylene oxide, such as propylene oxide or 1,2-epoxybutane, and the product is then reacted with ethylene oxide, no quaternary base is formed. We attribute this to the fact that these olefin oxides form secondary hydroxyl groups when reacted with an amine, in contrast with ethylene oxide which forms a primary hydroxyl group under the same conditions.

The secondary hydroxyl groups do not contribute to hydrogen bonding with the tertiary amine because of the greater electronegativity of the oxygen atom in the secondary alcohol and steric hindrance due to the alkyl or alkenyl group adjacent to the hydroxyl group. The tertiary nitrogen atom may also be sterically hindered by the secondary alkanol groups, contributing to the lack of hydrogen bonding.

Since the one to two or more mole adduct of alkyl or alkenyl primary amine and an olefin oxide other than ethylene oxide does not readily form undesirable quaternary bases, such adducts can be reacted with ethylene oxide without discoloration or polyethylene glycol formation.

Although the discussion so far has been directed primarily to alkyl or alkenyl primary amines, similar advantageous results are obtained by reacting alkyl or alkenyl trimethylene diamines with two to three or more moles of an olefin oxide other than ethylene oxide and then reacting the resulting adduct with ethylene oxide.

There is accordingly provided by this invention novel olefin oxide adducts of alkyl or alkenyl primary amines and alkyl or alkenyl trimethylene diamines which are much lighter in color and much lower in nonamine content, than prior products. There is also provided novel intermediates and processes of producing the intermediates and the final products.

The olefin oxide adducts of alkyl or alkenyl primary amines provided by this invention can be represented by the formula

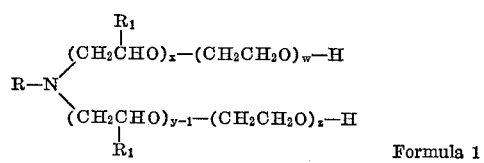

Formula 1 wherein R is alkyl or alkenyl, usually having a straight chain and having about 6 to 30 carbons, and advisably 8 to 20 carbons, $R_1$ is a lower alkyl having 1 to 3 carbons, $x$ and $y$ represent numbers not less than 1 and generally not greater than 5 and more advisably not greater than 2, and $w$ and $z$ represent numbers from about 1 to 50 and advisably from about 5 to 30. The alkenyl group represented by R will generally have one, two or three ethylenically unsaturated locations. Particularly suitable compounds appear to be those in which $x$ is 1 and $y$ is a number from 1 to 2, and with R being an alkyl or alkenyl having about 8 to 20 carbons, $R_1$ being an alkyl having 1 to 2 carbons, and $w$ and $z$ being numbers from 5 to 30.

The novel olefin oxide adducts of alkyl or alkenyl primary amines can be produced by reacting an alkyl or alkenyl primary amine with at least one mole of an olefin oxide having at least three carbons to produce an alkoxylated alkyl or alkenyl amine which is then reacted with ethylene oxide to produce the desired product. This process can be represented as follows:

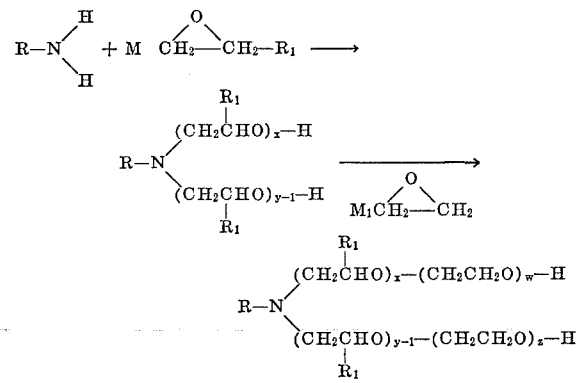

wherein R, $R_1$, $x$, $y$, $w$ and $z$ have the significance assigned in connection with Formula 1, and wherein M is the moles of reactant and equals $x+(y-1)$ and $M_1$ is the moles of reactant and equals $w+z$.

The alkyl and alkenyl primary amines used as starting materials are commercially available materials. Among such amines which can be used are the following:

n-octylamine palmitylamine
n-decylamine tallow amine
cocoamine soya amine
laurylamine stearylamine
myristylamine oleylamine Olefin oxides containing more than three carbons which can be used in practicing the process include propylene oxide, 1,2-epoxybutane and 1,2-epoxypentane.

The first step of the process is readily effected by bringing the alkyl or alkenyl primary amine and olefin oxide together, in the absence of water and in an inert atmosphere and subjecting them to an elevated temperature sufficient to form the adduct. Usually a temperature of about 80 to 200° C. is suitable for the reaction. The reaction proceeds at atmospheric pressure although superatmospheric pressures such as up to about 100 p.s.i. can also be used. At least one mole of an olefin oxide containing at least three carbons is reacted with each mole of amine. The use of one mole of an olefin oxide per mole of amine is sufficient to reduce the tendency for quaternary base formation in a subsequently formed two mole adduct. This means that the subsequent addition of ethylene oxide does not produce discoloration and nonamine formation to anywhere near the extent as when the amine adduct is prepared from ethylene oxide alone. However, it is recommended to use more than one mole of an olefin oxide having at least three carbons to react with one mole of amine. Usually, most satisfactory results are obtained with two or more moles of olefin oxide per mole of amine. No catalyst is required to effect the reaction of up to two moles of an olefin oxide having at least three carbons with each mole of amine; however, greater amounts of olefin oxide require use of a catalyst such as metallic sodium, sodium hydroxide, potassium hydroxide and sodium methylate.

The reaction between the olefin oxide having at least three carbons and the alkyl or alkenyl primary amine proceeds quickly and is usually substantially completed in about one to five hours. The resulting intermediate is then advisably vacuum stripped.

In the second step of the process the intermediate, formed as above, is reacted with ethylene oxide, or with a mixture of ethylene oxide with an olefin oxide having more than two carbons such as propylene oxide or 1,2-epoxybutane. This reaction is readily effected using the reaction conditions described for the first step; however, a catalyst such as one of those named above is used to promote the reaction. After the reaction has been terminated the product is advisably vacuum stripped and filtered.

It is also suitable in the second step of the reaction to employ a mixture of an olefin oxide having at least three carbons, such as propylene oxide or 1,2-epoxybutane, with ethylene oxide. However, when such mixtures are used it is advisable to employ at least one mole of ethylene oxide per each mole of an olfin oxide having at least three carbons. The products obtained from such a reaction can be represented by the formula

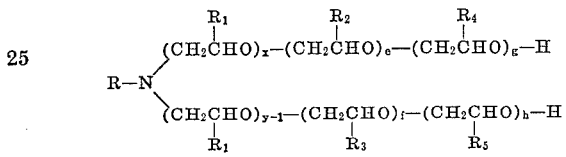

wherein R, $R_1$, $x$ and $y$ have the significance assigned in connection with Formula 1 and $R_2$, $R_3$, $R_4$, and $R_5$ are hydrogen or lower alkyls having 1 to 3 carbons with at least 25% of the groups being hydrogen and advisably at least 50% being hydrogen, and $e$, $f$, $g$ and $h$ are numbers from about 1 to 24 and the sum of $e+f+g+h$ is about 4 to 96. It should be understood that the order of the alkoxy groups in the chains, other than those bonded directly to the nitrogen, will be random and will probably not repeat in any set pattern. However, the average number and type of alkoxy groups in each chain can be expected to be proportional to the particular moles of olefin oxide used in the reacting mixture.

No special reaction conditions need be used with olefin oxide mixtures since good results can be obtained using substantially the same conditions as are specified herein for the use of only ethylene oxide in the second step.

There is also provided by this invention novel olefin oxide adducts of alkyl or alkenyl trimethylene diamines. These products can be represented by the formula

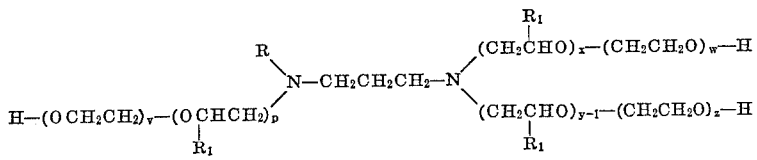

Formula 2 wherein R, $R_1$, $x$, $y$, $w$ and $z$ have the significance assigned in connection with Formula 1 and $p$ has the same meaning as $x$, $v$ has the same meaning as $w$ and $$x+(y-1)+p$$

equals at least 2 and advisably 3 although the sum can be higher such as a total of 6.

The novel olefin adducts of alkyl or alkenyl trimethylene diamines can be produced by reacting two or more moles of an olefin oxide having three or more carbons with one mole of an alkyl or alkenyl trimethylene diamine to form an intermediate adduct which is then reacted with ethylene oxide to form the desired product. This reaction can be represented as follows:

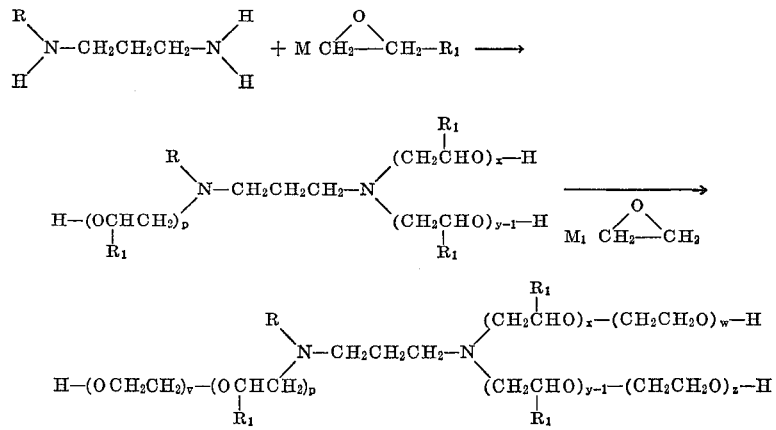

wherein R, $R_1$, $p$, $x$, $y$, $v$, $w$ and $z$ have the significance assigned in connection with Formulas 1 and 2, and M is the moles of reactant and equals $p+x+(y-1)$ and $M_1$ is the moles of reactant and equals $v+w+z$.

The reaction conditions used for each of the steps in producing the olefin oxide adducts of the alkyl or alkenyl trimethylene diamines are the same as those given previously for producing the adducts of the alkyl or alkenyl primary amines. However, in the first step a minimum of two moles of an olefin oxide having at least three carbons are reacted, per mole of diamine, to avoid formation of strong bases and nonamine compounds in the desired final product. It is advisable however to use at least three moles of olefin oxide having at least three carbons, per mole of diamine since this leads to an even better final product lower in nonamines and of even better color.

It is also within the scope of this invention to use, in the second step of the process, mixtures of ethylene oxide with an alofin oxide having at least three carbons. Conversely, in order to obtain the proper balance of properties in an olefin oxide-amine adduct, it may be desirable to add more than three moles of propylene oxide or 1,2-epoxybutane per mole of alkyl or alkenyl ethylene diamine before adding ethylene oxide. For instance, one mole of amine could be reacted with 2 moles of propylene oxide, and after the addition of catalyst, a third mole of propylene oxide could be added, followed by the addition of several moles of ethylene oxide. The product would exhibit the benefits of our invention, i.e., light color and low nonamine content.

The novel products provided herewith will generally have no more than 5% by weight of nonamine impurities and most often have no more than 3% by weight of such impurities.

The amine adducts prepared according to our invention and disclosed herein are useful as additives to viscose in rayon spinning to prevent plugging on spinnerettes. They are useful in hair colorants to give level or even dyeing and for emulsifying mineral oil for application to dusting cloths and mops. They are also useful as substantive softening agents on textile mill fabrics.

EXAMPLE 1

253 g. (1.25 moles) of a commercial distilled coco amine was charged to a 2 liter pressure reactor equipped with stirrer, gas inlet, exhaust, thermometer, and cooling coils. The amine was sparged with nitrogen, vacuum stripped to remove water, and then heated to 125° C. 145 g. (2.5 moles) of propylene oxide was forced into the reactor over a 3-hour period while it reacted with the amine. When the reaction of the amine with the propylene oxide was completed, the product was vacuum stripped, and 0.55 g. of dry sodium hydroxide was added. The product was vacuum stripped again, and then 715 g. (16.25 moles) of ethylene oxide was forced into the reactor over a 6 hour period while maintaining the temperature at 125° C. The product was vacuum stripped and filtered and was found to be a clear liquid with color 3 Gardner, which was completely soluble in water. The nonamine content of the product was determined to be 0.4%. The product contained an average of 15.0 moles of combined olefin oxide per mole of amine.

To compare this product with the product obtained from the conventional method for ethoxylating amines, the process of Example 1 was repeated except that 110 g. (2.5 moles) of ethylene oxide was substituted for propylene oxide in the first step. The final product, a 15 mole ethylene oxide adduct of coco amine, had a color of 9+ Gardner and contained 9.5% nonamine.

EXAMPLE 2

150 g. (0.55 mole) of commercial distilled stearyl amine was charged to the reactor described in Example 1. The charge was vacuum stripped and heated to 125° C. at which temperature 64 g. (1.1 moles) of propylene oxide was forced in. When the reaction was completed, the product was vacuum stripped, and 0.65 g. of dry sodium hydroxide was added. The product was vacuum stripped again, and then 1160 g. (26.4 moles) of ethylene oxide was forced in over an 8 hour period while maintaining the reaction temperature at 150° C. When the reaction was completed, the product was vacuum stripped and filtered. The product had a color of 3 Gardner, was a solid at room temperature, and a clear liquid at temperatures above its melting point of about 50° C. Analysis of the product showed that the nonamine content was 2.5%. The product contained 50.0 moles of combined olefin oxide per mole of amine.

A conventional product was made, substituting 48.5 g. (1.1 mole) of ethylene oxide for propylene oxide in the first step. The final product was a 50 mole ethylene oxide adduct of stearyl amine. The product had a Gardner color of 7 and containd 18.5% nonamine.

EXAMPLE 3

275 g. of a high quality commercial N-tallow trimethylene diamine was charged into the reactor described in Example 1. The quantity charged represents 0.8 equivalent of primary amine, and 0.825 equivalent of secondary amine, or 0.81 mole of diamine. The amine was sparged with nitrogen, vacuum stripped to remove water, and heated to 125° C. At this temperature the amine was reacted with 141 g. of propylene oxide which represents 2 moles per equivalent of primary amine plus 1 mole per equivalent of secondary amine to a total of 3 moles per mole of N-talloy trimethylene diamine. At the completion of the reaction, the product was vacuum stripped, and 0.16 g. of dry sodium hydroxide was added. The product was vacuum stripped again, and then 785 g. of ethylene oxide was added to the initial 3-mole propylene oxide adduct over a 6 hour period while maintaining the reaction temperature at 125° C. The product was vacuum stripped and filtered. The product contained an average of 25 moles of combined olefin oxide per mole of diamine and was clear liquid with color 3 Gardner. The nonamine content of the product was 1.8%.

A product was similarly prepared as above except that 107 g. of ethylene oxide was substituted for the propylene oxide in the first step. The product contained an average of 25 moles of ethylene oxide per mole of diamine. The color of the product was 10 Gardner and it contained 11% nonamine.

The foregoing detailed description has been given for clearness of understanding only, and no unnecessary limitations should be understood therefrom, as modifications will be obvious to those skilled in the art.

What is claimed is:

1. Compounds of the formulae $$R-N \begin{cases} (CH_2\overset{R_1}{C}HO)_x-(CH_2CH_2O)_w-H \\ (CH_2\overset{|}{C}HO)_{y-1}-(CH_2CH_2O)_z-H \\ \phantom{(CH_2C}R_1 \end{cases}$$

$$\underset{H-(OCH_2CH_2)_v-(O\overset{|}{C}HCH_2)_p}{\overset{R}{\diagdown}}N-CH_2CH_2CH_2-N\underset{\phantom{(CH_2C}R_1}{\overset{(CH_2\overset{R_1}{C}HO)_x-(CH_2CH_2O)_w-H}{\diagup}}\underset{}{}$$
$$\phantom{H-(OCH_2CH_2)_v-(OCHCH_2)_p}(CH_2\overset{|}{C}HO)_{y-1}-(CH_2CH_2O)_z-H$$
$$\phantom{H-(OCH_2CH_2)_v-(OCHCH_2)_p R_1}R_1$$

wherein R is an alkyl or alkenyl group containing about 6 to 30 carbons, $R_1$ is an alkyl having 1 to 3 carbons, $p$, $x$ and $y$ are numbers from 1 to 5 and in the second formula $x+(y-1)+p$ equals at least 2, and $v$, $w$ and $z$ are numbers from 1 to 50.

2. Compounds of the formula $$R-N \begin{cases} (CH_2\overset{R_1}{C}HO)_x-(CH_2CH_2O)_w-H \\ (CH_2\overset{|}{C}HO)_{y-1}-(CH_2CH_2O)_z-H \\ \phantom{(CH_2C}R_1 \end{cases}$$

wherein R is an alkyl or alkenyl group containing about 6 to 30 carbons, $R_1$ is an alkyl having 1 to 3 carbons, $x$ and $y$ are numbers from 1 to 5 and $w$ and $z$ are numbers from 1 to 50.

3. Compounds according to claim 2 in which R is an alkyl or alkenyl group containing about 8 to 20 carbons, $R_1$ is methyl, $x$ is 1, $y$ is a number from 1 to 2 and $w$ and $z$ are numbers from 5 to 30.

4. Compounds according to claim 3 in which R–N is derived from coco amine.

5. Compounds according to claim 2 in which R–N is derived from stearyl amine.

6. Compounds according to claim 3 in which R–N is derived from tallow amine.

7. Compounds according to claim 3 in which R–N is derived from soya amine.

8. Compounds of the formula $$R-N \begin{cases} (CH_2\overset{R_1}{C}HO)_x-(CH_2\overset{R_2}{C}HO)_e-(CH_2\overset{R_4}{C}HO)_g-H \\ (CH_2\overset{|}{C}HO)_{y-1}-(CH_2\overset{|}{C}HO)_f-(CH_2\overset{|}{C}HO)_h-H \\ \phantom{(CH_2C}R_1\phantom{)_{y-1}-(CH_2C}R_3\phantom{)_f-(CH_2C}R_5 \end{cases}$$

wherein R is an alkyl or alkenyl group containing about 6 to 30 carbons, $R_1$ is an alkyl having 1 to 3 carbons, $R_2$, $R_3$, $R_4$ and $R_5$ are hydrogen or an alkyl having 1 to 3 carbons with at least 25% of the groups being hydrogen, $e$, $f$, $g$ and $h$ are numbers from about 1 to 24, and $x$ and $y$ are numbers from 1 to 5.

9. Compounds according to claim 8 in which $R_1$ is methyl, $x$ is 1 and $y$ is a number from 1 to 2.

10. Compounds of the formula $$\underset{H-(OCH_2CH_2)_v-(O\overset{|}{C}HCH_2)_p}{\overset{R}{\diagdown}}N-CH_2CH_2CH_2-N\underset{\phantom{(CH_2C}R_1}{\overset{(CH_2\overset{R_1}{C}HO)_x-(CH_2CH_2O)_w-H}{\diagup}}$$
$$\phantom{H-(OCH_2CH_2)_v-(OCHCH_2)_p}(CH_2\overset{|}{C}HO)_{y-1}-(CH_2CH_2O)_z-H$$
$$\phantom{H-(OCH_2CH_2)_v-(OCHCH_2)_pR_1}R_1$$

wherein R is an alkyl or alkenyl group containing about 6 to 30 carbons, $R_1$ is an alkyl having 1 to 3 carbons, $p$, $x$ and $y$ are numbers from 1 to 5 and $x+(y-1)+p$ equals at least 2, and $v$, $w$ and $z$ are numbers from 1 to 50.

11. Compounds according to claim 10 in which $R_1$ is methyl, $x$ and $p$ are 1 and $y$ is a number from 1 to 2.

References Cited

UNITED STATES PATENTS

| | | | |
|---|---|---|---|
| 3,118,000 | 1/1964 | Dupre et al. | 260—584(B) |
| 3,141,905 | 7/1964 | Longley | 260—584(B)X |
| 3,206,511 | 9/1965 | Bindler et al. | 260—584(B)X |

CHARLES B. PARKER, Primary Examiner

R. L. RAYMOND, Assistant Examiner

U.S. Cl. X.R.

252—182; 260—247, 567.6, 601, 615

PO-1050
(5/69)

UNITED STATES PATENT OFFICE
CERTIFICATE OF CORRECTION

Patent No. 3,574,755            Dated April 13, 1971

Inventor(s) Robert B. McConnell and Robert A. Swenson

It is certified that error appears in the above-identified patent and that said Letters Patent are hereby corrected as shown below:

Column 3, line 55, "vlynl" should be --vinyl--. Column 7, line 42, "alofin" should be --olefin--. Column 9, line 26, insert the word --and-- between the formulas; line 6 "claim 2" should have been --claim 3--.

Signed and sealed this 17th day of August 1971.

(SEAL)
Attest:

EDWARD M. FLETCHER, JR.          WILLIAM E. SCHUYLER,
Attesting Officer                 Commissioner of Patent